US010135763B2

(12) United States Patent
Sheth et al.

(10) Patent No.: US 10,135,763 B2
(45) Date of Patent: Nov. 20, 2018

(54) SYSTEM AND METHOD FOR SECURE AND EFFICIENT COMMUNICATION WITHIN AN ORGANIZATION

(71) Applicant: Webaroo Inc, Fremont, CA (US)

(72) Inventors: Beerud Dilip Sheth, Fremont, CA (US); Nirmesh Satish Mehta, Fremont, CA (US)

(73) Assignee: WEBAROO INC., Fremont, CA (US)

(*) Notice: Subject to any disclaimer, the term of this patent is extended or adjusted under 35 U.S.C. 154(b) by 199 days.

(21) Appl. No.: 15/145,743

(22) Filed: May 3, 2016

(65) Prior Publication Data
US 2017/0324686 A1 Nov. 9, 2017

(51) Int. Cl.
H04L 12/58 (2006.01)
H04L 29/06 (2006.01)
H04L 12/803 (2013.01)
H04L 29/08 (2006.01)

(52) U.S. Cl.
CPC .......... H04L 51/046 (2013.01); H04L 47/125 (2013.01); H04L 51/04 (2013.01); H04L 51/08 (2013.01); H04L 63/0428 (2013.01); H04L 63/20 (2013.01); H04L 67/10 (2013.01); H04L 51/02 (2013.01)

(58) Field of Classification Search
CPC ...................................................... H04L 63/08
See application file for complete search history.

(56) References Cited

U.S. PATENT DOCUMENTS

| 8,639,950 B2 * | 1/2014 | Ferris | G06F 21/606 713/193 |
| 8,850,550 B2 * | 9/2014 | Dalzell | G06F 21/335 726/10 |
| 8,938,613 B2 * | 1/2015 | Burch | H04L 9/14 713/153 |
| 9,202,218 B1 * | 12/2015 | Crisman | G06Q 30/00 |
| 2007/0245414 A1 * | 10/2007 | Chan | H04L 63/0823 726/12 |

(Continued)

OTHER PUBLICATIONS

Srinivasan Sundara Rajan "On-Premise Data and Cloud Computing Integration Patterns" Nov. 25, 2011.

Primary Examiner — Aftab N. Khan
(74) Attorney, Agent, or Firm — HM Law Group LLP; Vani Moodley, Esq.

(57) ABSTRACT

The present disclosure relates to system(s) and method(s) for enabling secure and efficient communication between user devices within an organization. Cloud-based messaging services are popular, but organizations hesitate to use them due to the risk of private data residing on public cloud servers. Organizations prefer to host the servers within the organization (on-premise). However, this approach is neither efficient nor cost-effective. The disclosure describes a system and method for secure and efficient communication within an organization that uses an on-premise server to tokenize user messages, i.e. replacing user data in messages with token to generate a tokenized message and sending the tokenized message to the cloud server. In response, the cloud server returns a processed tokenized message, which is then de-tokenized by the on-premise server before forwarding the message to the user. The proposed system is both secure and efficient.

9 Claims, 3 Drawing Sheets

(56) References Cited

U.S. PATENT DOCUMENTS

| | | | |
|---|---|---|---|
| 2008/0168273 A1* | 7/2008 | Chung | H04L 63/168 713/172 |
| 2009/0119504 A1* | 5/2009 | van Os | H04L 9/3271 713/153 |
| 2015/0143468 A1* | 5/2015 | Hebert | H04L 63/10 726/4 |
| 2015/0257179 A1* | 9/2015 | Kim | H04W 76/021 370/328 |
| 2016/0028550 A1* | 1/2016 | Gaddam | H04L 9/3263 713/173 |

* cited by examiner

SYSTEM AND METHOD FOR SECURE AND EFFICIENT COMMUNICATION WITHIN AN ORGANIZATION

CROSS-REFERENCE TO RELATED APPLICATIONS AND PRIORITY

The present application does not claim priority from any patent application.

TECHNICAL FIELD

The present disclosure in general relates to communication over a cloud-based network. More particularly, the present invention relates to a system and method to enable secure communication between electronic devices using the cloud-based network.

BACKGROUND

Nowadays, internet based messaging applications like Whatsapp™ have become very popular in the consumer space. In most traditional implementations of messaging applications, end-users use their electronic devices like smart phones or laptops for communicating with other users in their social network, whereas a server for managing the messaging applications is built over a cloud-based messaging server. Such cloud-based messaging servers manage most components of the messaging applications. The cloud-based messaging server provides the following benefits over the conventional communication channels:

A developer of the messaging application can easily maintain and upgrade the messaging application at any point in time.

New features of the messaging application are available as soon as the messaging application is upgraded.

There is no need to build a new setup for a new customer. The new customer can sign up to the cloud based platform and deploy any online application instantly.

The cloud-based messaging server enables SaaS (software as a service) model for reducing development and maintenance cost of any messaging application.

However, there are some circumstances under which enterprises are not comfortable with hosting their data over the cloud-based messaging server, due to security reasons. These organizations prefer to keep their data within their organization over an on-premise data server. Such organizations include industries (e.g. healthcare, financial services) which are bound with regulatory requirements to keep data within the organization, and some customers (e.g. security agencies, government agencies) dealing with highly confidential information.

One of the approaches followed in the industries for data confidentiality in these industries is using end-to-end encryption. However, current encryption techniques are often not secure enough as the number of customers increase. Another way to meet such data security requirements is to have a messaging application that is completely hosted in an on-premise server. However, though this approach keeps the data secure, there are major cost implications of this approach which includes the developer cost of maintaining and upgrading the on-premise messaging applications. In some instances, new feature releases can take longer time for getting introduced into the on-premise data server. Further, the setup time of on-premise data server is much higher than the cloud based messaging server.

The key constraint is that enterprise insists on keeping the data on the on-premise data server, while the software vendors prefer to keep the software on the cloud based messaging server.

SUMMARY

This summary is provided to introduce aspects related to systems and methods for enabling secure communication between user devices and the aspects are further described below in the detailed description. This summary is not intended to identify essential features of the claimed subject matter nor is it intended for use in determining or limiting the scope of the claimed subject matter.

In one embodiment, a system for enabling secure communication between user devices within an organization is illustrated. The system comprises a memory and a processor coupled to the memory. In one embodiment, the processor is configured to execute program instructions stored in the memory. The processor may execute a programmed instruction stored in the memory for receiving a first message from a first user device. The first message stores user data to be sent to the second user device. Further, the processor may execute a programmed instruction stored in the memory for replacing the user data, in the first message, with a token to generate a tokenized message. Further, the processor may execute a programmed instruction stored in the memory for storing the user data and the token in a local repository. Further, the processor may execute a programmed instruction stored in the memory for transmitting the tokenized message to a cloud server, wherein the cloud server is configured to process the tokenized message to generate a processed tokenized message comprising address details of a second user device. Further, the processor may execute a programmed instruction stored in the memory for receiving the processed tokenized message, from the cloud server and replacing the token, in the processed tokenized message, with the user data to generate a second message, wherein the user data corresponding to the token is retrieved from the local repository. Further, the processor may execute a programmed instruction stored in the memory for transmitting the user data, through the second message, to the second user device based on the address details of the second user device.

In one embodiment, a method for enabling secure communication between user devices within an organization is illustrated. The method comprises a processor implemented step of receiving a first message from a first user device. The first message comprises user data to be sent to the second user device. Further, the method comprises a processor implemented step of replacing the user data, in the first message, with a token to generate a tokenized message. Further, the method comprises a processor implemented step of storing the user data and the token in a local repository. Further, the method comprises a processor implemented step of transmitting the tokenized message to a cloud server, wherein the cloud server is configured to process the tokenized message to generate a processed tokenized message comprising address details of a second user device. Further, the method comprises a processor implemented step of receiving the processed tokenized message, from the cloud server and replacing the token, in the processed tokenized message, with the user data to generate a second message, wherein the user data corresponding to the token is retrieved from the local repository. Further, the method comprises a processor implemented step of transmitting the user data, through the second message, to the second user device based on the address details of the second user device.

In one embodiment, a non-transitory computer readable medium embodying a program executable in a computing device for for enabling secure communication between user devices within an organization is illustrated. The program comprises a program code for receiving a first message from a first user device. The first message comprises user data to be sent to the second user device. Further, the program comprises a program code for replacing the user data, in the first message, with a token to generate a tokenized message. Further, the program comprises a program code for storing the user data and the token in a local repository. Further, the program comprises a program code for transmitting the tokenized message to a cloud server, wherein the cloud server is configured to process the tokenized message to generate a processed tokenized message comprising address details of a second user device. Further, the program comprises a program code for receiving the processed tokenized message, from the cloud server and replacing the token, in the processed tokenized message, with the user data to generate a second message, wherein the user data corresponding to the token is retrieved from the local repository. Further, the program comprises a program code for transmitting the user data, through the second message, to the second user device based on the address details of the second user device.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
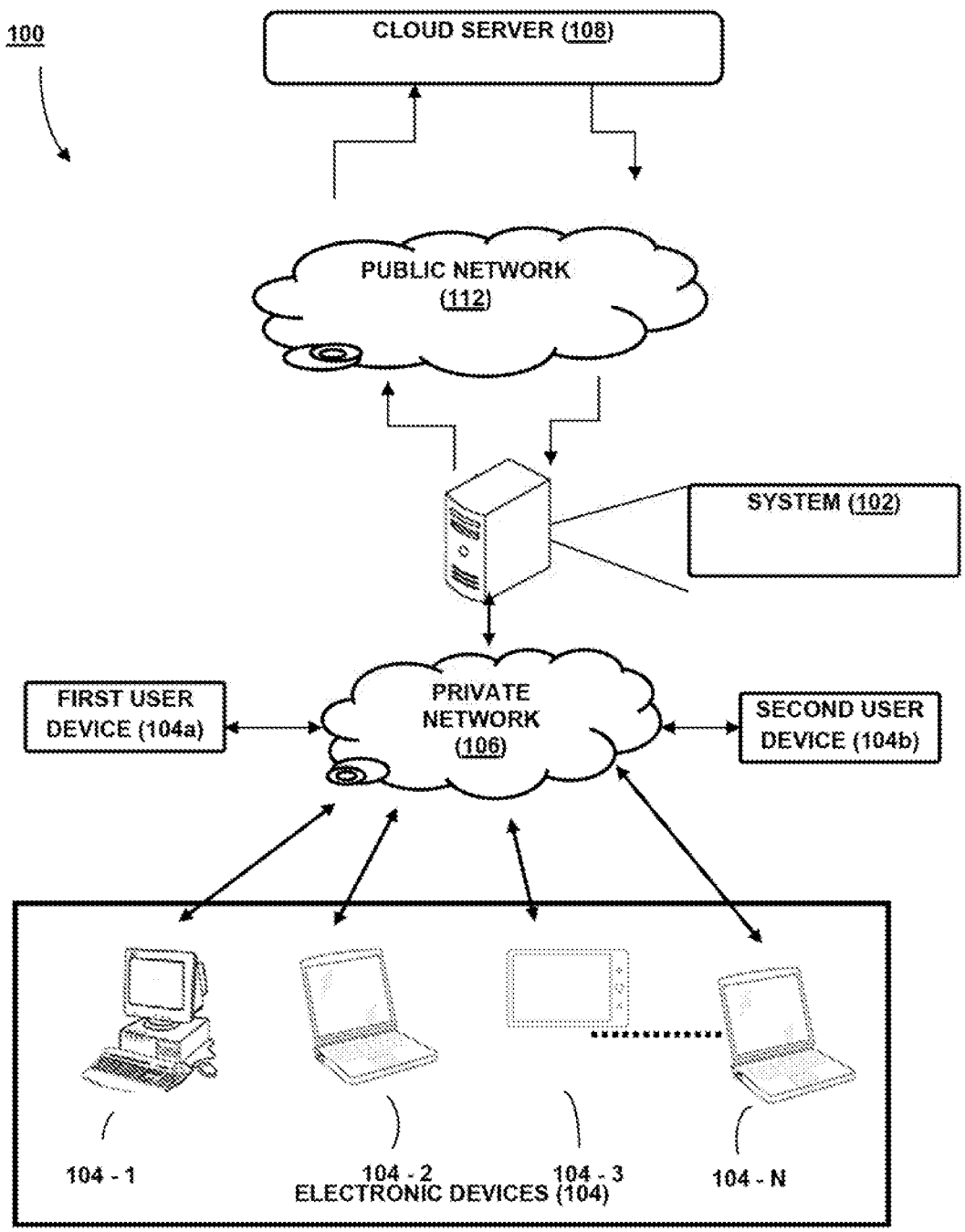
FIG. 1 illustrates a network implementation of a system, for enabling secure communication between user devices within an organization, in accordance with an embodiment of the present subject matter.

The key constraint in any the messaging application is that enterprise insists on keeping the data on the on-premise data server, while the software vendors prefer to keep the messaging application on the cloud based messaging server. To address this problem, the present invention discloses a system that can satisfy both these constraints simultaneously. This is achieved by keeping a data server for the messaging application on-premise (inside the organization), while keeping the messaging server for the messaging application on the cloud platform. The message sent by an end-user device is first received by the on-premise data server, which tokenizes the user message, (i.e. converts user data into tokens) before sending it to the cloud-based messaging server. The cloud based messaging server processes the message for routing it to the appropriate recipients. Further, the cloud based messaging server sends the processed message back to the on-premise data server, which de-tokenizes the message (i.e. converts the token back into user data) and forwards it to the end-user device.

In one embodiment, the present subject matter relates to a system for enabling secure communication between user devices. The system comprises a memory and a processor coupled to the memory. In one embodiment, the processor is configured to execute program instructions stored in the memory. The processor may execute a programmed instruction stored in the memory for receiving a first message from a first user device. The first user device may be a laptop, a smart phone, a tablet or any other electronic device used for electronic communication. Further, the first message may be in the form of text message, or a structured message, or a video message or an image. The first user device may be operated by a first user intending to transmit the first message to a second user having a second user device. The first user and the second user may be part of the same organization with their user devices connected to the system. The user devices may be connected to the system over a private network. The private network may be a closed network and is accessible only to the users in the organization. Further, once the first message is received from the first user device, in the next step, the processor may execute a programmed instruction stored in the memory for replacing the user data, in the first message, with a token to generate a tokenized message. The token is configured to store a unique identifier corresponding to the message.

Once the token is generated, in the next step, the processor may execute a programmed instruction stored in the memory for store the user data and the token in a local repository of the memory. The local repository acts as a local storage space for storing data/messages. Further, the processor may execute a programmed instruction stored in the memory for transmitting the tokenized message to a cloud server. In one embodiment, the cloud server is configured to process the tokenized message to generate a processed tokenized message comprising address details of a second user device. The system is connected to the cloud server through a public network. The public network may be an open network and is accessible to any user connected to the Internet. The cloud server is capable of facilitating communication between the first user device and the second user device based on address details of the first user device and the second user device. In one embodiment, the address details may include an Internet protocol (IP) address or a MAC address of the user device. To enable communication between the user devices, the cloud server is configured to maintain address details of all the user devices registered with the system. Furthermore, the processor may execute a programmed instruction stored in the memory for receiving the processed tokenized message from the cloud server. Furthermore, the processor may execute a programmed instruction stored in the memory for replacing the token, in the processed tokenized message, with the user data to generate a second message. For this purpose, the processor is configured to retrieve the user data corresponding to the token from the local repository. Once the user data is retrieved, in the next step, the processor may execute a programmed instruction stored in the memory to for transmitting the user data, through the second message, to the second user device based on the address details of the second user device.

While aspects of described system and method for enabling secure communication between user devices may be implemented in any number of different computing systems, environments, and/or configurations, the embodiments are described in the context of the following exemplary system.

Referring now to FIG. 1, a network implementation 100 of a system 102 for enabling secure communication between user devices is disclosed. Although the present subject matter is explained considering that the system 102 is implemented on a server (also referred as an on-premise data server), it may be understood that the system 102 may also be implemented in a variety of computing systems, such as a laptop computer, a desktop computer, a notebook, a workstation, a mainframe computer, a server, a network server, and the like. In one implementation, the system 102 may be configured to connect with a cloud based messaging server hereafter referred as a cloud server 108 over a public network 112. Further, it may be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a private network 106.

In one implementation, the private network 106 may be a wireless network, a wired network or a combination thereof. The private network 106 can be implemented as one of the different types of networks, such as intranet, local area network (LAN), wide area network (WAN), the internet, and the like. The private network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the private network 106 may include a variety of network devices, including routers, bridges, servers, computing devices, storage devices, and the like.

In one embodiment, the system 102 may be connected to a first user device 104a and a second user device 104b. The first user device 104a may be configured to transmit and receive messages to/from the second user device 104b, whereas the second user device 104b may be configured to transmit and receive messages to/from the first user device 104a. For transmitting a message to the second user device 104b, initially, the first user device 104a may accept a first message from the first user over the first user device 104a. Further, the first user device 104a is configured to transmit the first message to the system 102 through the private network 106. The first message corresponds to a user data to be sent by the first user to the second user. Once the first message is received by the system 102, in the next step, the system 102 may generate a token corresponding to the first message. Further, the system 102 is configured to save the user data of the first message and the token corresponding to the message in a local repository of the memory of the system 102. Further, the system 102 is configured to replace the user data, in the first message, with a token to generate a tokenized message. Further, the system 102 is configured to transmit the token, in the form of the tokenized message, to the cloud server 108 through the public network 112.

In one embodiment, after receiving the message from the first user device 104a, the system 102 may analyse the message to identify one or more blocks in the message with confidential information such as user ID, password, digital signature and the like. Further, the system 102 may generate a token corresponding to blocks with confidential information and transmit the token to the cloud server 108 through the public network 112.

The cloud server 108 is configured to maintain address details of the first user device 104a, second user device 104b and other user devices 104 linked with the system 102. Once the tokenized message is received by the cloud server 108, the cloud server 108 determines the address details of the second user device 104b and transmits the token back to the system 102 with the address details of the second user device 104b in the form of a processed tokenized message. After receiving the token and the address of the second user device 104b from the processed tokenized message, the system 102 may retrieve the user data corresponding to the token from the local repository. Further, the system is configured to generate a second message storing the user data and send the message to the address of the second user device 104b. In one embodiment, the address details may include an Internet protocol (IP) address or a MAC address of the user device 104. The working of the system 102 to enable communication between the user devices 104 is further explained with respect to the block diagram of FIG. 2.

Figure 2:
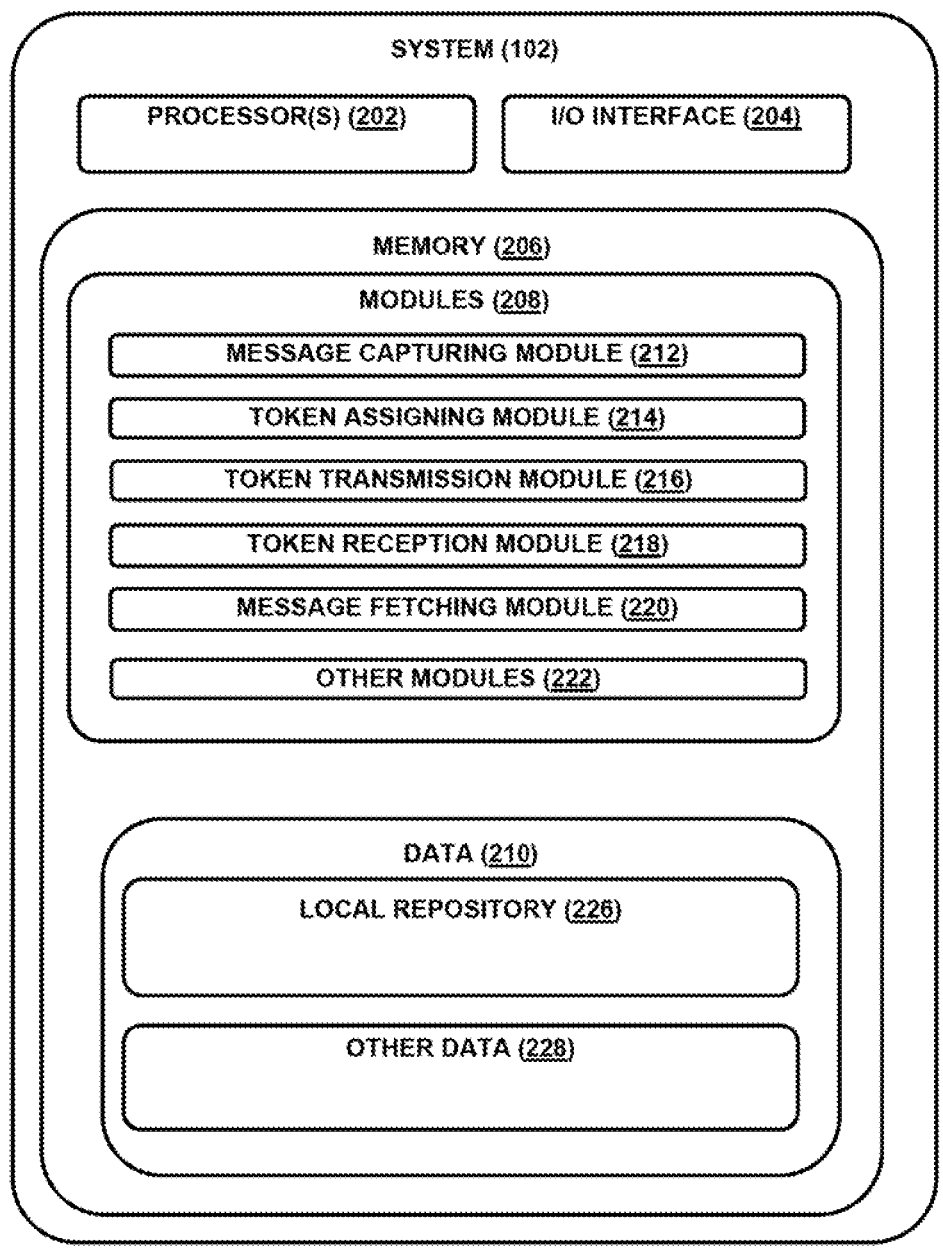
FIG. 2 illustrates the system, for enabling secure communication between user devices within the organization, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a message capturing module 212, a token assigning module 214, a token transmission module 216, a token reception module 218, a message fetching module 220, and other modules 222. The other modules 222 may include programs or coded instructions that supplement applications and functions of the system 102.

The data 210, amongst other things, serves as a repository for storing data processed, received, and generated by one or more of the modules 208. The data 210 may also include a local repository 226, and other data 228. In one embodiment, the local repository 226 may be configured to store messages generated by the user devices 104 connected to the system 102 and the tokens corresponding to the messages generated by the system 102. In one embodiment, the other data 228 may include data generated as a result of the execution of one or more modules in the other module 222.

In one embodiment, the first user device 104a and second user device 104b are connected to the system 102 through the private network 106. Initially, the message capturing module 212 of the system 102 is configured to receiving a first message, comprising user data, from the first user device 104a connected to the system 102. In one embodiment, the first message may be a structured message. The structured message may be at least in the form of text message or an Interactive Voice Response (IVR) message configured to capture inputs of the second user.

Once the first message is received at the system 102, in the next step, the token assigning module 214 is configured to assign a token to the first message. The token is configured to store a unique identifier corresponding to the first message. Once the token is generated, the token assigning module 214 stores the user data of the first message and the token in the local repository 226. Further, the token transmission module 216 is configured to replacing the user data in the first message with the token to generate a tokenized message. Further, the token transmission module 216 is configured to transmit the token in the form of tokenized message to the cloud server 108. The cloud server 108 is capable of facilitating communication between the first user device 104a and the second user device 104b based on address details of the first user device and the second user device. For this purpose, the cloud server 108 is configured to maintain address details of the first user device 104a, the second user device 104b and other user devices 104 linked to the system 102. Once the token is received by the cloud server 108, the cloud server 108 determines the address of the second user device 104b and transmits the token back to the system 102 with the address details of the second user device 104b. For this purpose, the cloud server 108 is configured to the cloud server is configured to process the tokenized message to generate a processed tokenized message comprising address details of a second user device.

Further, the token reception module 218 is configured to receive the token and address details of the second user device 104b from the cloud server 108 in the form of processed tokenized message. Further, the message fetching module 220 is configured to retrieve the user data corresponding to the token from the local repository 226. Once the user data is retrieved, the message fetching module 220 is configured to generate a second message from the user data and transmit the second message to the second user device 104b using the address details of the second user device 104b. The method for transmitting message between the user devices 104 is further illustrated with respect to the flow diagram depicted in FIG. 3.

Figure 3:
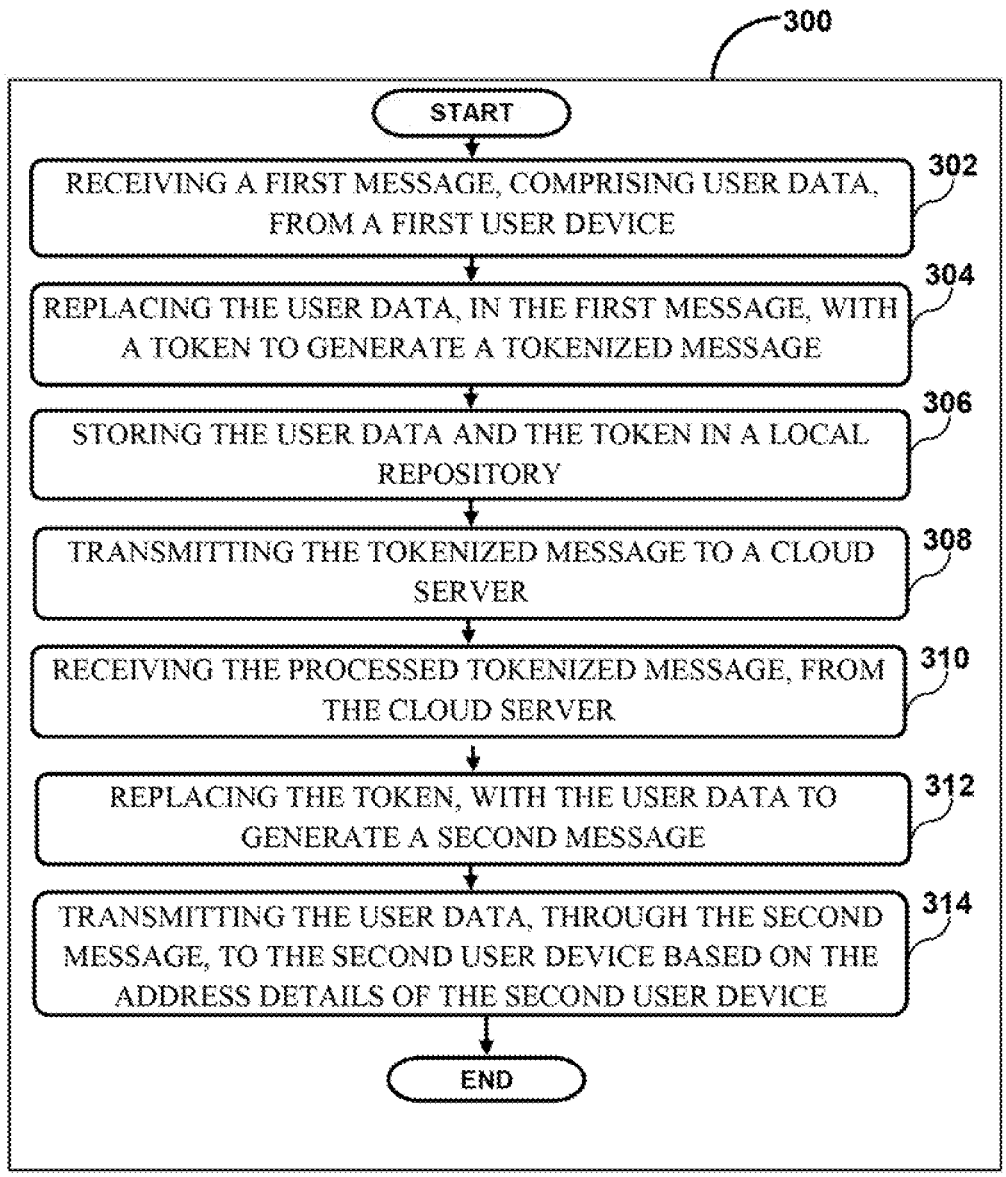
FIG. 3 illustrates a flow diagram for enabling secure communication between user devices using the system, in accordance with an embodiment of the present subject matter.

Referring now to FIG. 3, a method 300 for transmitting message between the user devices 104 is disclosed, in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the message capturing module 212 of the system 102 is configured for receiving a first message, comprising user data, from the first user device 104a connected to the system 102.

At block 304, once the first message is received, in the next step, the token assigning module 214 is configured for assigning a token to the first message. The token is configured to store a unique identifier corresponding to the message.

At block 306, once the token is generated, the token assigning module 214 stores the user data and the token in the local repository 226.

At block 308, the token transmission module 216 is configured to transmit the token to the cloud server 108 in the form of a tokenized message. The cloud server 108 is capable of facilitating communication between the first user device 104a and the second user device 104b. For this purpose, the cloud server 108 is configured to maintain address details of the first user device 104a, second user device 104b and other user devices 104 linked to the system 102. Once the token is received by the cloud server 108, the cloud server 108 determines the address details of the second user device 104b and transmits the token back to the system 102 with the address details of the second user device 104b.

At block 310, the token reception module 218 is configured to receive the token and address details of the second user device 104b from the cloud server 108. The address details of the second user device 104b and the token may be received in the form of a processed tokenized message.

At block 312, the message fetching module 220 is configured to retrieve the user data corresponding to the token from the local repository 226.

At block 314, once the user data is retrieved, the message fetching module 220 is configured for transmitting the user data, through the private network 106, to the second user device 104b using the address details of the second user device. The user data may be transmitted to the second user device 104b in the form of a second message comprising the user data.

Although implementations for methods and systems for transmitting message between the user devices has been described, it is to be understood that the appended claims are not necessarily limited to the specific features or methods described. Rather, the specific features and methods are disclosed as examples of implementations for transmitting message between the user devices.

What is claimed is:

1. A system for enabling secure communication between user devices within an organization, the system comprising:
a memory; and
a processor coupled to the memory, wherein the processor is configured to execute program instructions stored in the memory for:
receiving a first message, comprising user data, from a first user device;
replacing the user data, in the first message, with a token to generate a tokenized message;
storing the user data and the token in a local repository;
transmitting the tokenized message to a cloud server, wherein the cloud server is configured to process the tokenized message to generate a processed tokenized message comprising address details of a second user device, wherein the first user device and the second user device are connected over a private network;
receiving the processed tokenized message, from the cloud server;
replacing the token, in the processed tokenized message, with the user data to generate a second message, wherein the user data corresponding to the token is retrieved from the local repository; and
transmitting the user data, through the second message, to the second user device based on the address details of the second user device, wherein the second message is transmitted to the second user device through the private network, using the address details of the second user device.

2. The system of claim 1, wherein the cloud server is implemented over a public communication network.

3. The system of claim 1, wherein the cloud server enables a structured message communication between the first user device and the second user device, and wherein first user device and the second user device are registered with the cloud server.

4. The system of claim 1, wherein the token stores a unique identifier corresponding to the user data.

5. A method for enabling secure communication between user devices within an organization, the method comprising steps of:
receiving, by a processor, a first message, comprising user data, from a first user device;
replacing, by the processor, the user data, in the first message, with a token to generate a tokenized message;
storing, by the processor, the user data and the token in a local repository;
transmitting, by the processor, the tokenized message to a cloud server, wherein the cloud server is configured to process the tokenized message to generate a processed tokenized message comprising address details of a second user device, wherein the first user device and the second user device are connected over a private network;
receiving, by the processor, the processed tokenized message, from the cloud server;
replacing, by the processor, the token, in the processed tokenized message, with the user data to generate a second message, wherein the user data corresponding to the token is retrieved from the local repository; and
transmitting, by the processor, the user data, through the second message, to the second user device based on the address details of the second user device, wherein the second message is transmitted to the second user device through the private network, using the address details of the second user device.

6. The method of claim 5, wherein the cloud server is implemented over a public communication network.

7. The method of claim 5, wherein the cloud server enables a structured message communication between the first user device and the second user device, and wherein first user device and the second user device are registered with the cloud server.

8. The method of claim 5, wherein the token stores a unique identifier corresponding to the user data.

9. A non-transitory computer readable medium embodying a program executable in a computing device for enabling secure communication between user devices within an organization, the computer program product comprising:
a program code for receiving a first message, comprising user data, from a first user device;
a program code for replacing the user data, in the first message, with a token to generate a tokenized message;
a program code for storing the user data and the token in a local repository;
a program code for transmitting the tokenized message to a cloud server, wherein the cloud server is configured to process the tokenized message to generate a processed tokenized message comprising address details of a second user device, wherein the first user device and the second user device are connected over a private network;
a program code for receiving the processed tokenized message, from the cloud server;
a program code for replacing the token, in the processed tokenized message, with the user data to generate a second message, wherein the user data corresponding to the token is retrieved from the local repository; and
a program code for transmitting the user data, through the second message, to the second user device based on the address details of the second user device, wherein the second message is transmitted to the second user device through the private network, using the address details of the second user device.

* * * * *